US011088754B2

(12) United States Patent
Levitsky et al.

(10) Patent No.: US 11,088,754 B2
(45) Date of Patent: *Aug. 10, 2021

(54) AUTONOMOUS RECEPTION BEAM REFINEMENT AND TRACKING

(71) Applicant: QUALCOMM Incorporated, San Diego, CA (US)

(72) Inventors: Michael Levitsky, Rehovot (IL); Shmuel Vagner, Raanana (IL); Igor Gutman, Ramat Gan (IL); Gideon Shlomo Kutz, Ramat Hasharon (IL); Assaf Touboul, Netanya (IL); Ran Berliner, Kfar-Aviv (IL); Shay Landis, Hod Hasharon (IL); Meir Tsadik, Hod Hasharon (IL)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/234,365

(22) Filed: Dec. 27, 2018

(65) Prior Publication Data

US 2019/0239135 A1 Aug. 1, 2019

Related U.S. Application Data

(60) Provisional application No. 62/623,318, filed on Jan. 29, 2018.

(51) Int. Cl.
*H04B 7/08* (2006.01)
*H04L 5/00* (2006.01)
(Continued)

(52) U.S. Cl.
CPC ........... *H04B 7/088* (2013.01); *H04B 7/0626* (2013.01); *H04L 5/0048* (2013.01);
(Continued)

(58) Field of Classification Search
CPC ..... H04B 7/088; H04B 7/0626; H04L 5/0048; H04L 5/0057; H04W 36/30; H04W 72/1226
See application file for complete search history.

(56) References Cited

U.S. PATENT DOCUMENTS

2018/0323858 A1* 11/2018 Bergstrom ........... H04B 7/0857
2019/0007116 A1*  1/2019 Chang ................. H04B 7/0695
(Continued)

FOREIGN PATENT DOCUMENTS

| CN | 104702324 A | 6/2015 |
| CN | 106559121 A | 4/2017 |

(Continued)

OTHER PUBLICATIONS

Huawei et al., "Beam Measurement, Reporting and Indication", 3GPP Draft; 3GPP TSG RAN WG1 Meeting #91, R1-1719422, 3rd Generation Partnership Project (3GPP), Mobile Competence Centre, 650, Route Des Lucioles, 7-06921 Sophia-Antipolis Cedex, France, vol. RAN WG1, No. Reno, USA; Nov. 27, 2017-Dec. 1, 2017, Nov. 17, 2017 (Nov. 17, 2017), XP051369125, 11 Pages, Retrieved from the Internet: URL:http://www.3gpp.org/ftp/tsg%5Fran/WG1%5FRL1/TSGR1%5F91/Docs/ [retrieved on Nov. 17, 2017] Sections 2 and 3.1, p. 1-p. 3.

(Continued)

*Primary Examiner* — Ajay Cattungal
(74) *Attorney, Agent, or Firm* — Arent Fox, LLP

(57) ABSTRACT

In order to enable asynchronous, autonomous reception beam switching at a UE while minimizing degradation due to a transient in link performance, a method, apparatus, and computer-readable medium for wireless communication are provided. The apparatus receives CSI-RS on different reception beams in different symbols, wherein one reception beam being a current serving reception beam, and determines whether to switch to a different reception beam based on a (Continued)

SPEFF metric for the different reception beam and/or a severity of a potential link transient qualified in terms of the expected CQI/MCS degradation in the channel. The apparatus may switch from a current serving reception beam to a second reception beam when a first channel quality for the current serving reception beam is within a threshold value of a second channel quality for the second reception beam, the second channel quality being measured using a current configuration.

30 Claims, 12 Drawing Sheets

(51) Int. Cl.
  *H04W 36/30* (2009.01)
  *H04W 72/12* (2009.01)
  *H04B 7/06* (2006.01)
(52) U.S. Cl.
  CPC ........... *H04L 5/0057* (2013.01); *H04W 36/30* (2013.01); *H04W 72/1226* (2013.01)

(56) References Cited

U.S. PATENT DOCUMENTS

| | | | |
|---|---|---|---|
| 2019/0014568 A1* | 1/2019 | Nilsson | H04W 24/08 |
| 2019/0098520 A1 | 3/2019 | Kim | |
| 2019/0104549 A1 | 4/2019 | Deng et al. | |
| 2019/0116009 A1 | 4/2019 | Yum et al. | |
| 2019/0190669 A1* | 6/2019 | Park | H04W 56/001 |
| 2019/0238209 A1 | 8/2019 | Levitsky et al. | |
| 2019/0253211 A1 | 8/2019 | Kakishima et al. | |
| 2020/0036431 A1* | 1/2020 | Petersson | H04B 7/088 |
| 2020/0195324 A1* | 6/2020 | Grant | H04W 24/10 |

FOREIGN PATENT DOCUMENTS

| | | |
|---|---|---|
| WO | 2017068547 A1 | 4/2017 |
| WO | 2017146759 A1 | 8/2017 |
| WO | 2019007483 A1 | 1/2019 |

OTHER PUBLICATIONS

International Search Report and Written Opinion—PCT/US2019/013142—ISA/EPO—dated Mar. 22, 2019.

* cited by examiner

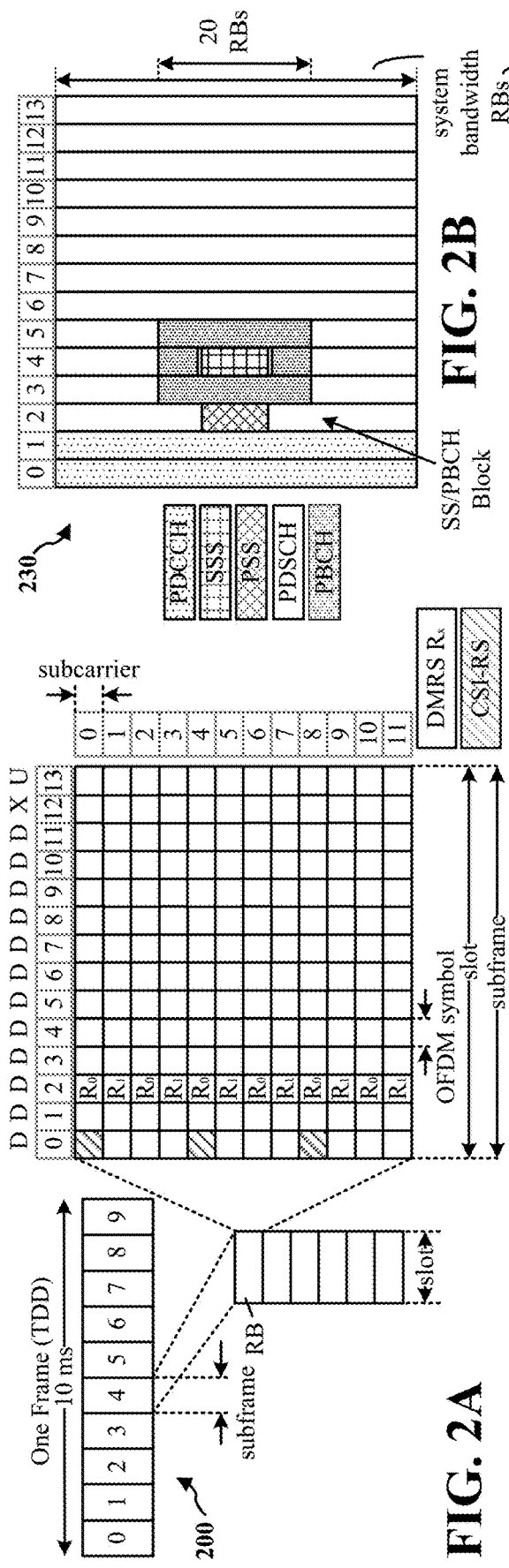
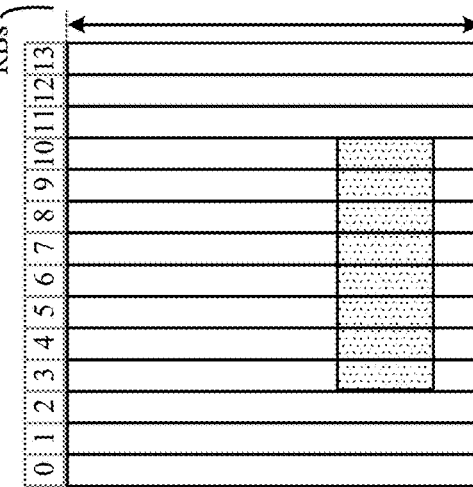
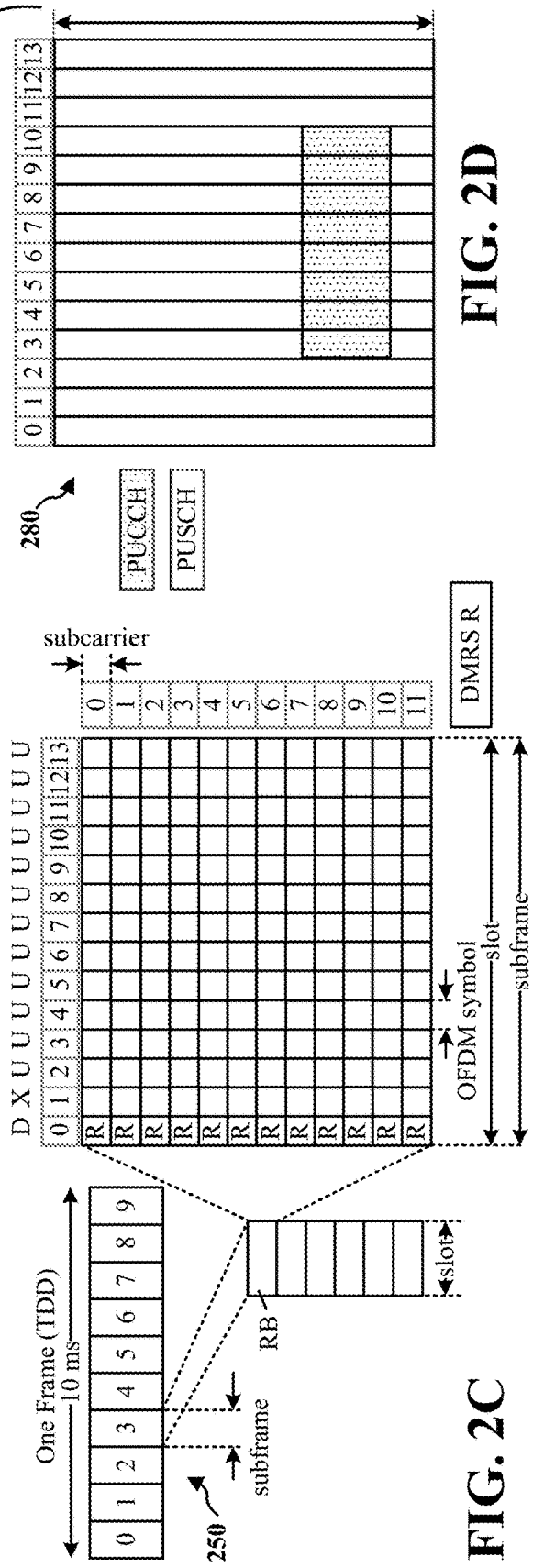
FIG. 2A
FIG. 2B
FIG. 2C
FIG. 2D

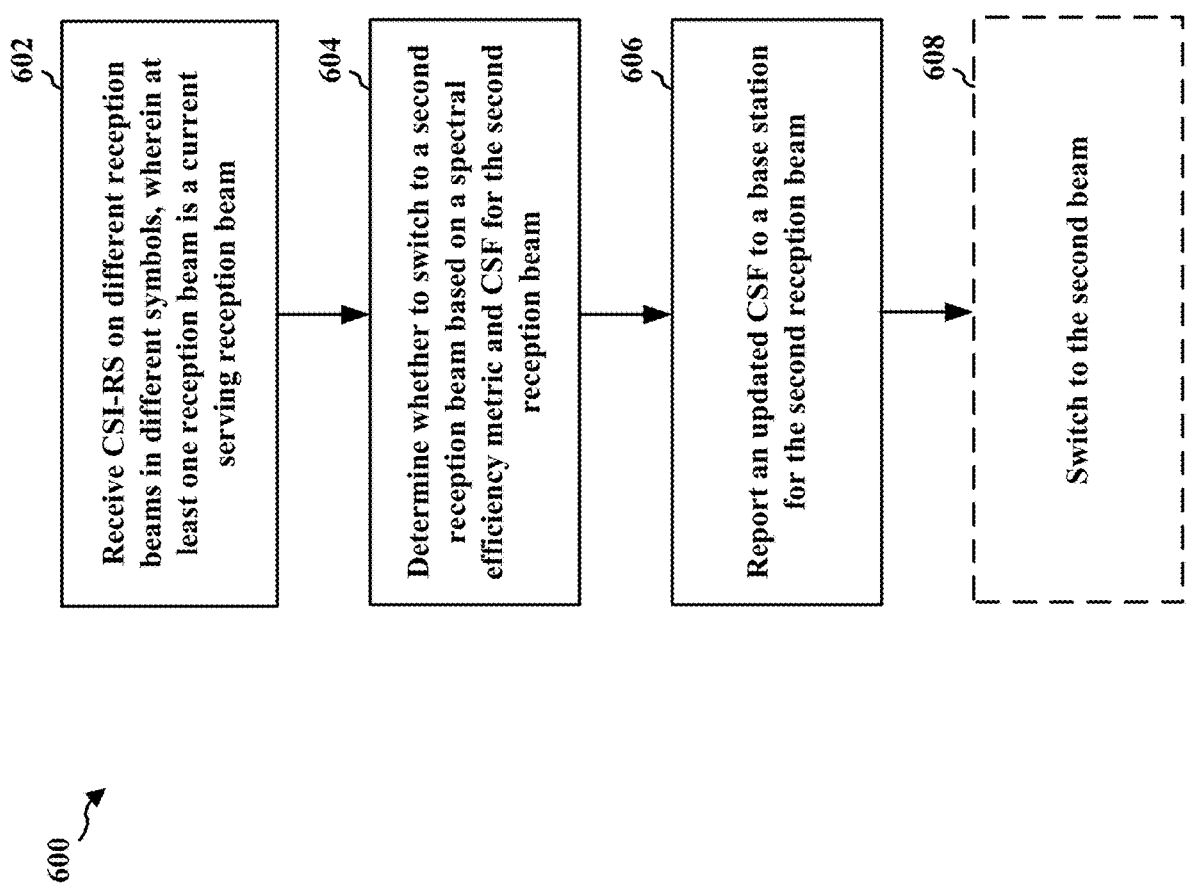

AUTONOMOUS RECEPTION BEAM REFINEMENT AND TRACKING

CROSS-REFERENCE TO RELATED APPLICATIONS

This application claims the benefit of U.S. Provisional Application Ser. No. 62/623,318, entitled "Autonomous Reception Beam Refinement and Tracking" and filed on Jan. 29, 2018, which is expressly incorporated by reference herein in its entirety. This application is related to U.S. application Ser. No. 16/234,137, entitled "Autonomous Reception Beam Refinement and Tracking" and filed on Dec. 27, 2018.

BACKGROUND

Technical Field

The present disclosure relates generally to communication systems, and more particularly, to beam refinement in wireless communication.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Wireless communication may be based on beamformed transmission beams and reception beams, such as in mmWave (mmW) communication. Over time, channel conditions may change for the transmission and reception beams, and beam refinement may be necessary. While a user equipment (UE) may determine to switch to a new reception beam having better characteristics, there may be a delay in the base station adopting the optimal transmission configuration (based on the updated Channel State Feedback (CSF) for the new reception beam) that should be used coupled to the new reception beam. This delay may lead to signal degradation or a transient (i.e., a temporary decrease) in link performance.

Aspects presented herein enable asynchronous, autonomous reception beam switching at a UE while minimizing degradation due to a transient in link performance. The aspects presented herein can improve communication between the UE and a base station when the UE's autonomous reception beam management/switching is unsynchronized with base station.

In an aspect of the disclosure, a method, a computer-readable medium, and an apparatus are provided for wireless communication at a user equipment. The apparatus receives CSI-RS on different reception beams in different symbols, wherein at least one reception beam is a current serving reception beam and determines whether to switch to a different reception beam based on a spectral efficiency metric and a CSF opportunity. Thus, the UE may determine whether to switch beams based on the spectral efficiency metric and based on consistency considerations about beam switching to the different reception beam. The apparatus may switch from a current serving reception beam to the different reception beam based on the determination and may report an updated CSF report to a base station when the UE determines to switch to the different reception beam.

In another aspect of the disclosure, a method, a computer-readable medium, and an apparatus are provided for wireless communication at a UE. The apparatus receives CSI-RS on different reception beams in different symbols, wherein at least one reception beam is a current serving reception beam. The apparatus compares a first measurement for the current serving reception beam to a second measurement for a second reception beam. The apparatus switches to the second reception beam when a first channel quality for the current serving reception beam is within a threshold value of a second channel quality for the second reception beam, the second channel quality being measured using a current configuration. The apparatus may determine whether a link transient will occur if a switch is performed from the current serving reception beam to the second reception beam. The UE may switch to the different reception beam, and when the link transient is expected, and may schedule a switch to the different reception beam after a CSF report opportunity, e.g., in order to minimize the link transient time duration.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C and 2D are diagrams illustrating examples of a first 5G/NR frame, DL channels within a 5G/NR subframe, a second 5G/NR frame, and UL channels within a 5G/NR subframe, respectively.

FIG. 6 is a flowchart of a method of wireless communication.

DETAILED DESCRIPTION

Figure 1:
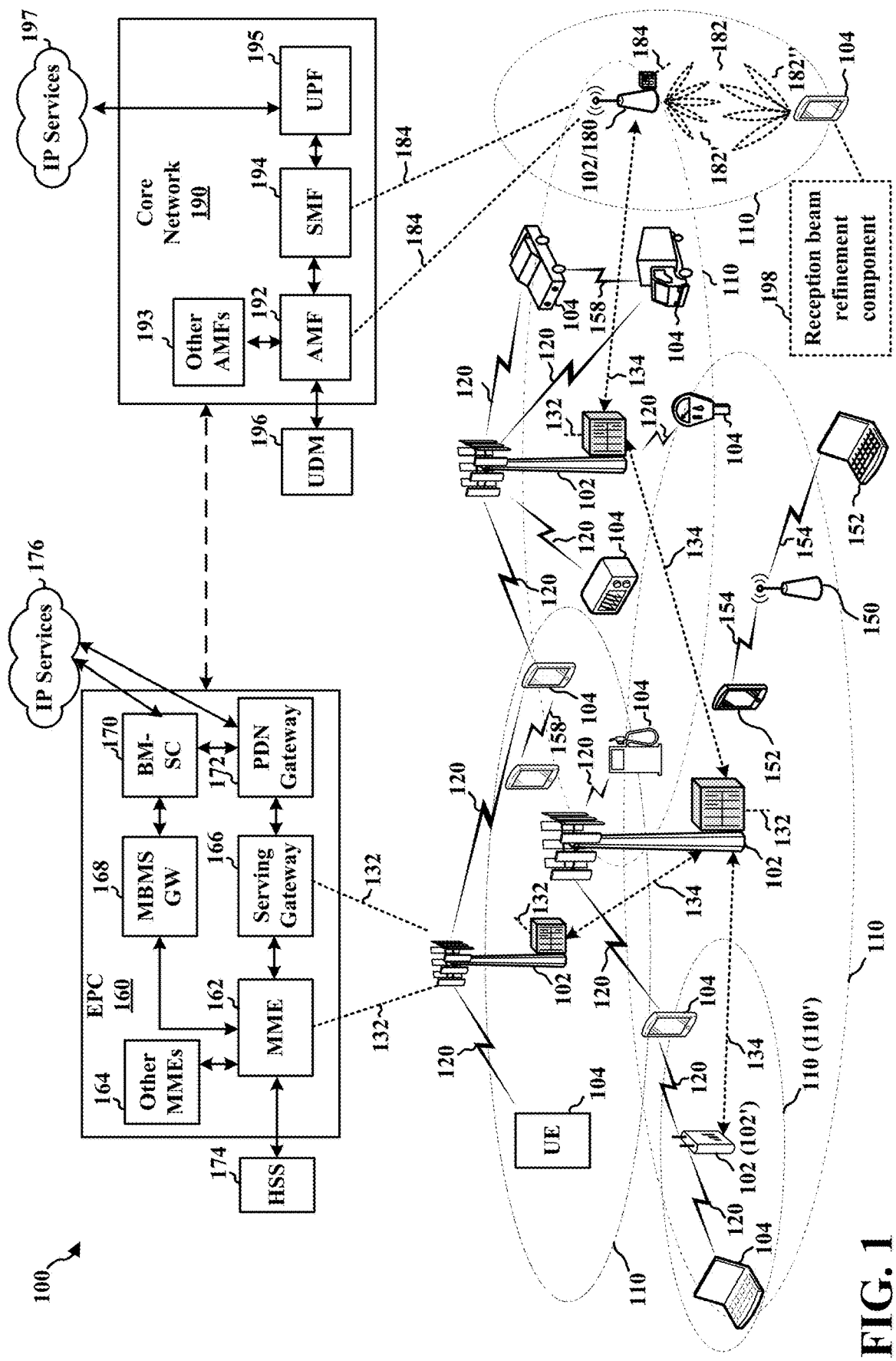
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another Core network (e.g., a 5G Core Network 5GC) 190. The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range.

The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a Reception beam refinement component 198 configured to refine the reception beam at the UE 104 in accordance with the aspects presented herein, including in connection with FIGS. 4-8.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kKz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
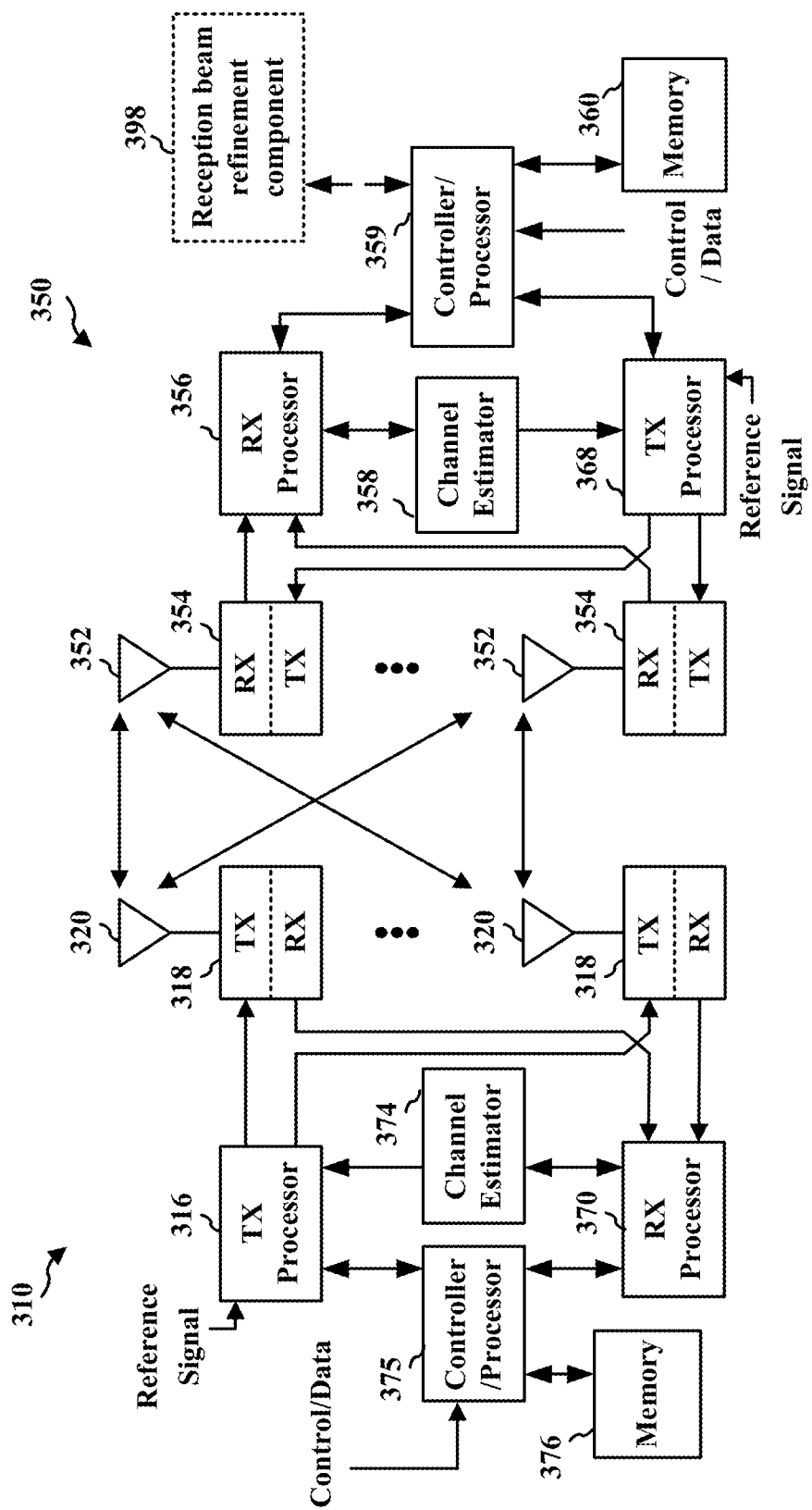
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations. In certain aspects, the UE 350 may include a reception beam refinement component 398 configured to refine the reception beam at the UE 350 in accordance with the aspects presented herein, including in connection with FIGS. 4-8.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
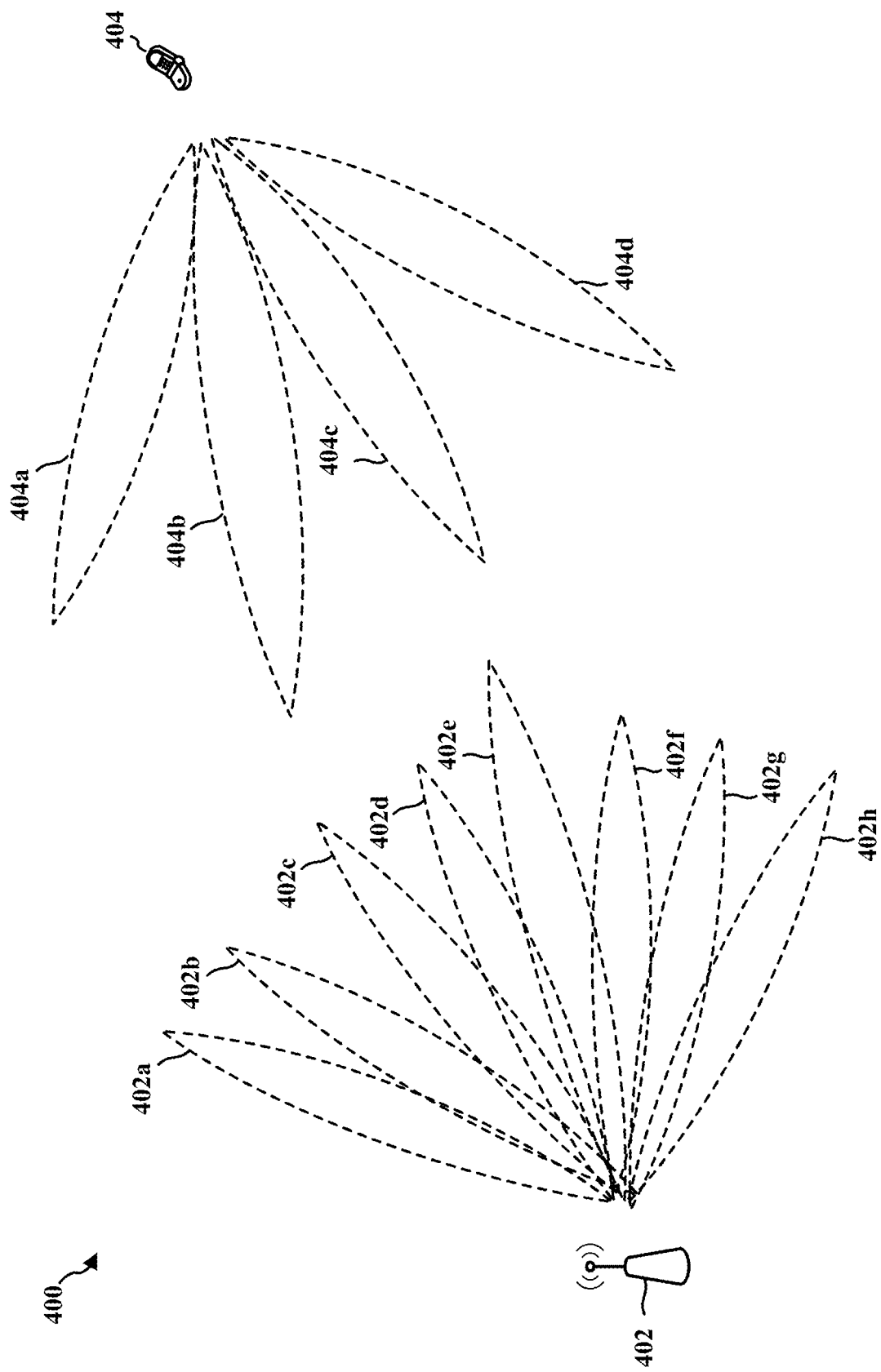
FIG. 4 is a diagram illustrating a base station in communication with a UE.

FIG. 4 is a diagram 400 illustrating a base station 402 in communication with a UE 404. Referring to FIG. 4, the base station 402 may transmit a beamformed signal to the UE 404 in one or more of the directions 402a, 402b, 402c, 402d, 402e, 402f, 402g, 402h. The UE 404 may receive the beamformed signal from the base station 402 in one or more receive directions 404a, 404b, 404c, 404d. The UE 404 may also transmit a beamformed signal to the base station 402 in one or more of the directions 404a-404d. The base station 402 may receive the beamformed signal from the UE 404 in one or more of the receive directions 402a-402h. The base station 402/UE 404 may perform beam training to determine the best receive and transmit directions for each of the base station 402/UE 404. The transmit and receive directions for the base station 402 may or may not be the same. The transmit and receive directions for the UE 404 may or may not be the same.

Thus, FIG. 4 illustrates directional transmissions relying on analog beamforming on a transmission (Tx) and Reception (Rx) side, such as may be employed in mmW communication, e.g., in 5G NR mmW communication. Data transmission may use some combination of Tx and Rx beams that maximize throughput and reliability of a communication link between a UE and a base station. As illustrated in FIG. 4, a base station may transmit to a UE using a selected Tx beam at the base station, and a UE may receive the transmission using a selected Rx beam at the UE. Similarly, communication from the UE may be transmitted using a Tx beam at the UE and may be received by the base station using an Rx beam at the base station. In order to allow efficient and reliable communication in time, this optimal combination of Tx and Rx beams may need to be adaptively identified and tracked. The best, estimated combination of Tx and Rx beams that is estimated may become a composite serving beam used for data transmission, e.g., PDSCH. In order to allow serving beam tracking, Tx and Rx beams may be continually re-selected and refined by a base station and/or UE based on Channel State Information Reference Signal (CSI-RS) or partially on a Synchronization Signal Block (SSB) reference signal, which may be defined to be used in the system for beam management procedures. When a better beam component is estimated, whether a Tx beam, Rx beam, or a coupled combination of Tx beam and Rx beam, a beam switching event may occur. Three example categories of beam management mechanisms in 5G NR mmW communication include: (1) an initial coarse Tx beam and Rx beam selection and alternate Tx beam and Rx beam tracking; (2) Tx beam refinement for the serving beam; and (3) Rx beam refinement for the serving beam. The initial coarse beam selection and tracking procedures may be referred to as P1 procedures. This type of beam management may be performed based on SSB and/or CSI-RS reference signals. The Tx beam refinement procedures for the serving Tx beam may be referred to as P2 procedures, and such beam management may be based on CSI-RS reference signals. The Rx beam refinement procedures for the serving Rx beam may be referred to as P3 procedures, and such beam management may be based on CSI-RS reference signals.

For serving Rx beam tracking and refinement at the UE under P3 procedures, CSI-RS allocation may be provided from time to time. Thus, the base station may transmit CSI-RS to enable the UE to perform Rx beam tracking and refinement using the CSI-RS. The CSI-RS allocation may be periodic, aperiodic or semi-persistent. During each P3 session, a same allocated CSI-RS resource may be repeated over several CSI-RS symbols in a slot, while for each one of these symbols, the same Tx beam and the same CSI-RS resource configuration may be preserved. This enables the UE to test several Rx beam hypotheses in order to select a best Rx beam for the serving Rx beam. The number of CSI-RS symbol repetitions is defined by the base station and may be signaled to a UE as a part of CSI-RS allocation control information.

A physical channel and its capacity change over time so that the quality of Tx and/or Rx beams may change. As well, the UE may move relative to the base station leading to changes in beam quality. Channel state information (CSI) may be used to determine current channel conditions of beams and to assist in link adaptation procedures in order to maintain robust and reliable communication. For example, CSI can be measured by the receiver, and the measurement can be transmitted back to the transmitter. For example, a UE may measure CSI and transmit the measurements to a base station. The base station may use the measurements to adaptively determine optimal transmission configurations for Tx and/or Rx beams as channel conditions change. Some of the parameters used in CSI messages are Precoding Matrix Indicator (PMI), a digital precoding matrix indicator, Rank Indicator (RI), and Channel Quality Indicator (CQI) that is linked to a Modulation and Coding Scheme (MCS) index. These parameters describe an optimal digital precoding, a number of spatial layers, and a modulation and code rate advised to be used for the transmission on Tx side. These parameters (PMI, RI, and CQI) may be coupled in a Channel State Feedback (CSF) report that based on measurements by the UE on Rx side using a CSI-RS logical channel. The UE may transmit the CSF report back to the base station. Each time beam switching takes place, the previous CSF can be invalidated since channel conditions may have changed. As a result, link performance can be degraded from time that the beam is switched until the first updated CSF Report is obtained from the UE following the switch and adopted by the base station for PDSCH transmissions. The link performance degradation may be due to a mismatch between the known CSF from the UE's previous CSF report and the changed CSI that prompted the UE to switch Rx beams and may negatively impact the communication of data between the base station and UE. This negative impact on the data transmission as a result of a beam switching event will be referred in herein as a "transient" in link performance. A link transient may comprise a temporary decrease in the quality of the link during the period that the base station does not have updated CSF information about the switch to the second reception beam.

This inconsistency between the beam used at the UE and the CSF information upon which the base station relies can reduce the quality of the link until the UE can provide updated CSF information at the next CSF report opportunity. Thus, a link transient refers to a negative impact in link performance that occurs for a period of time, e.g., when the UE switches beams and before the base station receives updated CSF information from the UE. A link transient period refers to the duration of time over which the negative impact in link performance occurs, e.g., from the beam switch at the UE until the base station is able to respond to the beam switch based on receiving an updated CSF report.

Aspects presented herein enable P3 beam management procedures for autonomous Rx beam switching by a UE that reduces transient periods in link performance that may follow a Rx beam switching event. The Rx beam refinement procedures presented herein allow a UE to test several Rx beam alternatives in order to select best Rx beam that will maximize serving beam spectral efficiency and reliability. In order to truly select a more spectrally efficient beam, beam selection may be based on a Spectral Efficiency Metric (SPEFF) rather than being based only on Signal Received Power (RSRP) or Signal-to-Interference-Plus-Noise Ratio (SINR) measurements, which may be suggested as low complexity alternatives for beam management procedures. Selecting Rx beam using an RSRP metric can result in a Rank Indicator (RI)=1 being used in the link instead of RI=2 available with the previous Rx beam, e.g., when the new Rx beam has significantly higher power than the previous one but also higher spatial correlation between 2 layers that dictates RI=1. As presented herein, the accuracy of Rx beam selection may be improved through the use of a spectral efficiency criterion. The spectral efficiency may also be used as a metric for CSF evaluation.

Spectrum efficiency is a measure of use of a spectrum or bandwidth unit relating to the amount of data that can be transmitted over a given bandwidth in a communication system per time unit. Spectral efficiency may be expressed using a measure of "bits per second per hertz," or bits/s/Hz. In other words, it can be defined as the net data rate in bits per second (bps) divided by the bandwidth in hertz. Net data rate and symbol rate may relate to the raw data rate which may include the usable payload and all overhead. Thus, a raw data rate may be equal to payload+overhead. A net data rate may be equal to the raw data rate−overhead. Spectral efficiency may be equal to the net data rate or a raw data rate (e.g., in bps)/Channel Bandwidth (e.g., in Hz). This may be determined to compare PMI/RI hypotheses per beam and for comparisons of beams.

The maximal achievable SPEFF for PDSCH per beam is estimated for comparison given all the PMI, RI options defined in the system for PDSCH transmission. A maximum achievable SPEFF estimation per beam is done by means of the following steps. First, an assumption may be made of an N-port allocation on BM resources (N-ports being higher or equal than the max RI that can be used for data transmission). For example, for mmW communication, with a maximum RI=2 leads to N-ports being equal to 2 ports at least, and may be limited to not more than 2 ports. It can also be assumed that there is no precoding applied on BM allocation.

Next, a SPEFF is calculated per RI, PMI hypothesis (the RI, PMI hypotheses being those that can be used for a PDSCH transmission). The SPEFF may be calculated by applying PMI(RI) precoding hypotheses on the estimated channel and then evaluating the SPEFF estimation per each one of the PMI(RI) precoding hypotheses. This SPEFF calculation may be done using several demodulation related assumptions in order to predict the achievable SPEFF for PDSCH taking in account a particular modem implementation.

Then, a maximum SPEFF may be selected from the calculations performed for each of the hypotheses calculated per each RI+PMI combination.

The procedure may be repeated for each tested reception beam candidate. Once a maximum SPEFF is identified per reception beam candidate, a beam that gives the highest achievable estimate for PDSCH SPEFF may be identified as the best beam. Thus, SPEFF may be used as a relative measure to compare PMI, RI hypotheses for a reception beam and to identify a best beam from among the candidate reception beams.

At times, an Rx beam refinement session based on special CSI-RS allocations might not be followed by a coupled full CSF report allocated to UE that enables the UE to communicate the updated CSF for the new selected Rx beam to the base station. The lack of a CSF report allocation may adversely result in a potential link transient until the UE's next opportunity to provide an updated CSF report. The next CSF reporting opportunity may not be scheduled for a significantly long time, e.g., with aperiodic CSF reporting or periodic reporting with long periodicity. During this time, link conditions can degrade significantly due to CSF inconsistency after a Rx beam switch has occurred. Therefore, when a UE identifies a better Rx beam, the new Rx beam can be tested to see whether a transient drop in maximal operational MCS will be expected compared to the currently available MCS (known from the current CSF report/DL transmissions configurations), e.g., if the current non-updated CSF known on the gNB side will be used in connection with the new selected Rx beam. Until the next CSF report from the UE, the base station will only know the current CSF report, which was optimal for the current Rx beam. Therefore, by the UE testing the newly selected Rx beam based on the current CSF report may minimize a negative transient impact on the link if the UE determines to switch from the current serving beam. Additionally, the UE may schedule an Rx beam switching event, in a manner that is fully controlled by the UE, at a time that is optimal (e.g., based on transient duration time minimization) based on the timing of a CSF report. For example, the UE may schedule the Rx beam switching event in a manner that reduces a transient duration. It may be desirable to have a full CSF report coupled to a P3 session, but this may vary according to base station implementations, etc.

Rx beam refinement algorithms may also vary. Rx beam management may be performed autonomously by the UE without a defined, synchronized Rx beam switching mechanism with the base station. Thus, even when an updated CSF report is communicated to a base station for a link with a new Rx beam, it might not be possible to switch the Rx beam at the UE and to apply the corresponding CSF report for PDSCH transmissions at the base station at the same, predefined moment in time. As a result, a link transient is likely to occur. It may be difficult to predict a worst-case scenario that may be caused by even a short time transient depending on its severity. The negative impact during the transient time may be controlled through a tradeoff between potential improvement of the link in a long run (when updated CSF will be adopted for the new beam) and an expected link degradation for the short transient time. While synchronized Rx beam switching could eliminate the transient period, such synchronized Rx beam switching may not be an option.

The present application provides a way to allow Rx beam selection and switching to a better Rx beam based on a SPEFF metric without a transient period in link conditions or with a limited negative impact during the transient period until an updated CSF can be adopted by the system.

Figure 5A:
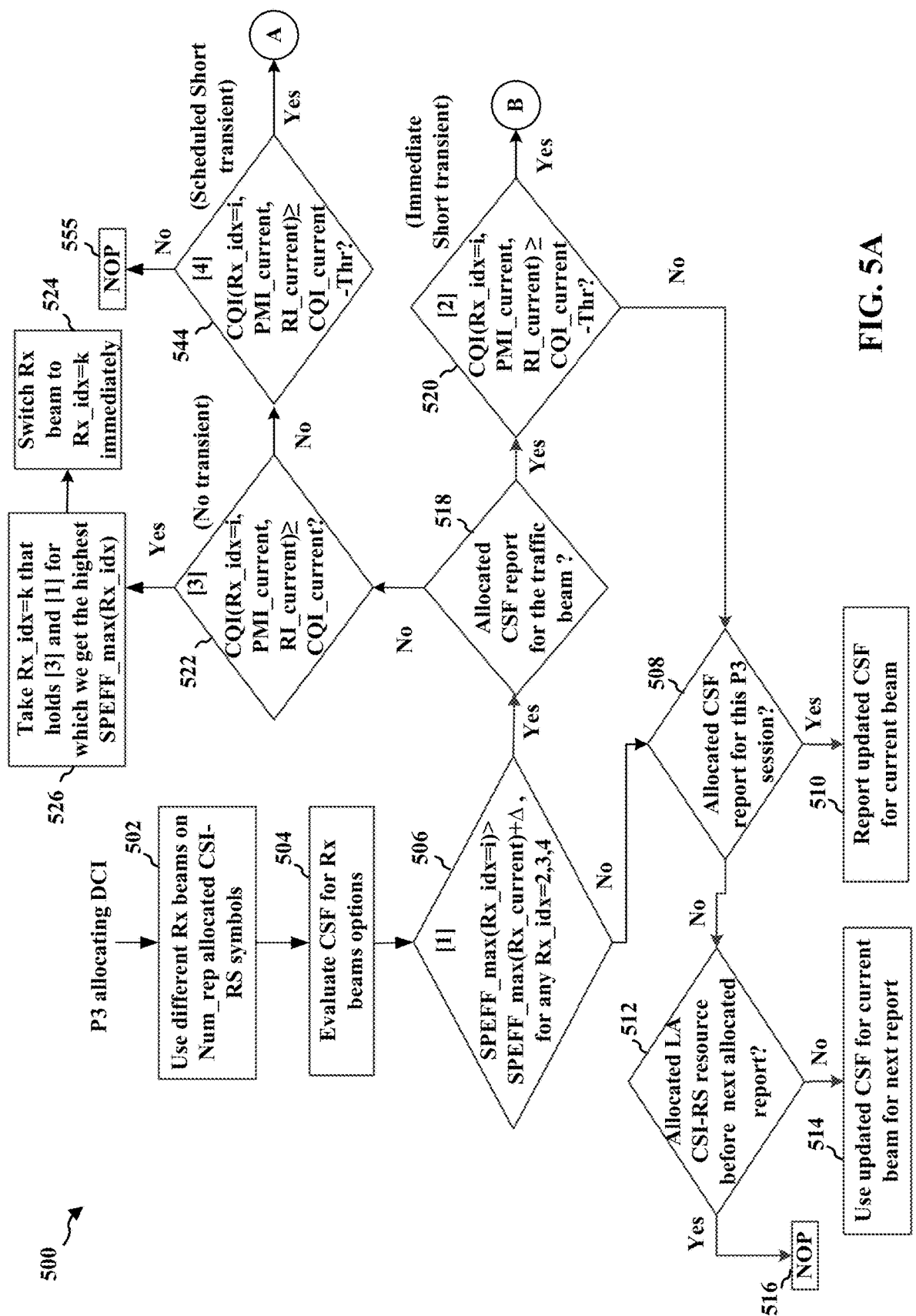
FIGS. 5A and 5B are a flowchart of a method of beam refinement.
Figure 5B:
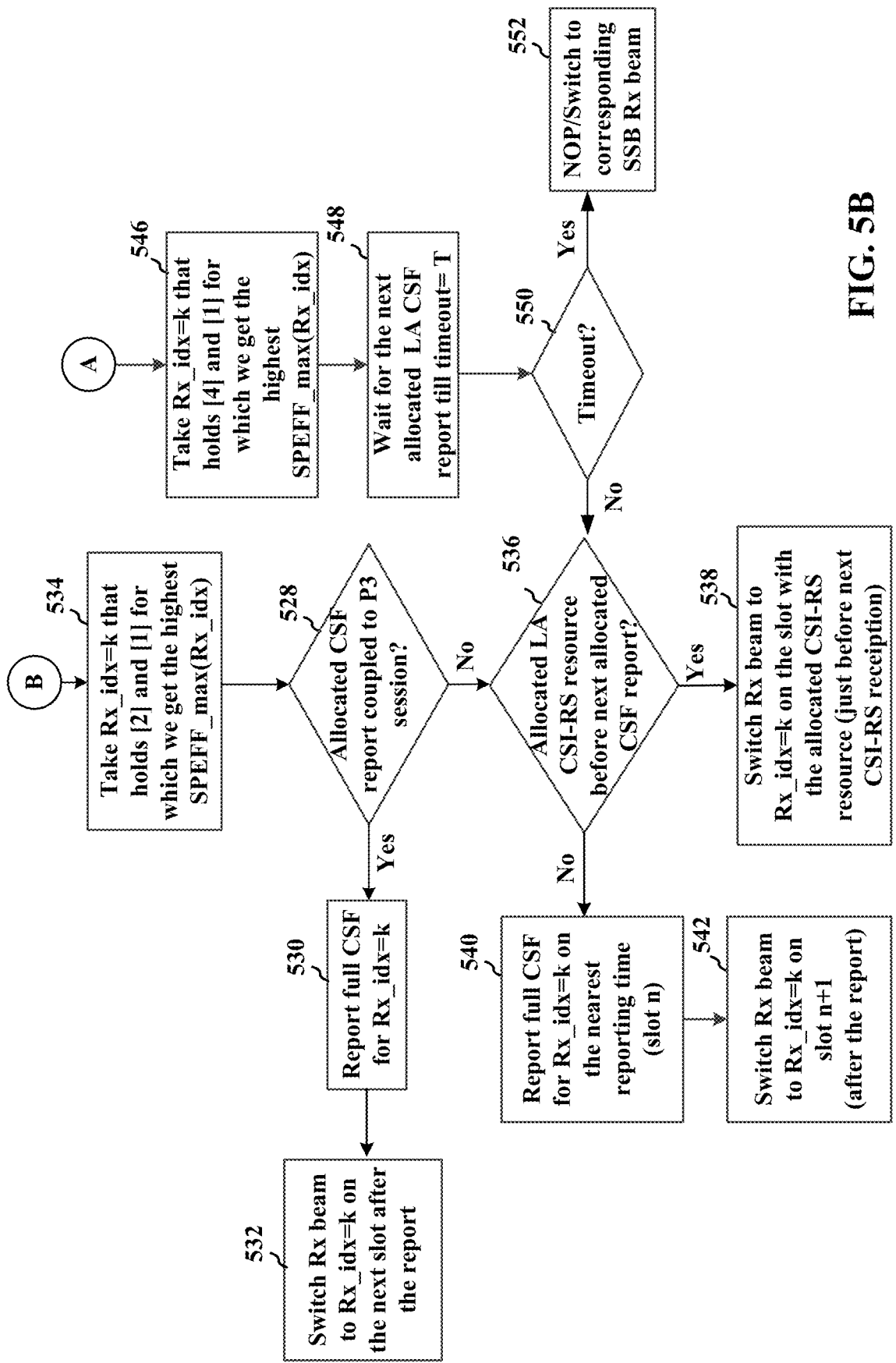

FIGS. 5A and 5B illustrate an example flowchart 500 of an algorithm for autonomous Rx beam management at a UE based on P3 CSI-RS allocations that enables improved Rx beam selection at the UE. The beam selection in FIGS. 5A and 5B may be performed by a UE (e.g., the UE 104, 350, 404, the apparatus 702, 702') communicating with a base station (e.g., 102, 180, 310, 402, 750). This example supposes CSI-RS resources with 2 ports, while single port or 2 port options may be allowed. PDSCH precoding for NR mmW may be performed with a 2 ports codebook. The 2 port example is merely used to illustrate the principle, and aspects may also be applied to a different number of ports. Each time the UE tests beam hypotheses, the UE may test the current serving Rx beam. It may be assumed that only the serving Tx beam is used by the base station for the P3 allocation, e.g., without combined P2+P3 procedures. If a combined P2+P3 allocation is used, the proposed algorithm may be use CSI-RS resource transmitted with the serving Tx beam from the base station. In the example of FIGS. 5A and 5B, it is assumed that 4 repetitions of CSI-RS resources are allocated for P3 procedures, and therefore 4 Rx beam hypotheses are tested. However, any number of repetitions may be assumed in other examples, and a corresponding number of Rx beam hypotheses may be tested.

P3 parameters, such as the number of CSI-RS repetitions, CSF allocations, etc., may be allocated to the UE from the base station, e.g., via L1 or L2 control signaling. At 502, the UE uses different Rx beams to receive repetitions of the allocated CSI-RS symbols. One of the tested Rx beams is the current serving Rx beam. For example, the first Rx beam used to receive the first CSI-RS symbol may be the current serving Rx beam. Different Rx beams hypotheses may be used for reception of different CSI-RS resource repetitions in time. The number of Rx beam hypotheses that are tested may be based on the number of repetitions of CSI-RS that are allocated to the UE. In the example with 4 repetitions, 4 Rx beam hypotheses may be tested by the UE, one of which being the current serving Rx beam.

At 504, the UE evaluates a full CSF, including RI, PMI, CQI, for each of the Rx beam hypotheses from step 502. The full CSF and all of its intermediate results, e.g., an SPEFF estimated for each one of the tested PMI+RI hypotheses, may be evaluated for each repetition of the CSI-RS symbols.

At 506, the UE may determine whether the maximum Spectral Efficiency Metric (SPEFF) of the channel for a particular Rx beam (Rx_idx) is greater than the maximum SPEFF for the current serving Rx beam (Rx_current) by a particular threshold amount, e.g., a difference Δ. The maximum SPEFF is the maximum among all the tested PMI+RI options Rx_idx indicates a tested Rx beam for an index $x \in [1, \ldots NUM_{Rx\_beams}]$, where $NUM_{Rx\_beams}$ indicates the number of tested beams. Thus, for an example with 4 CSI-RS repetitions, where Rx_id1 is the current serving beam Rx_current, the determination may be made for each of the other reception beams that were tested, e.g., for beams Rx_id2, Rx_id3, and Rx_id4. Δ provides a minimal difference (e.g., a threshold, hysteresis, etc.) in SPEFF that leads the UE to avoid potential Rx beam switching having an SPEFF difference of less than the minimal difference amount A from the current Rx beam. This parameter, Δ, helps to avoid Rx beam jitter. If a higher SPEFF is identified with a difference of more than Δ from the current Rx beam's SPEFF, the UE continues to 508. Otherwise, the UE determines not to switch Rx beams and reports the CSF (PMI, RI,CQI) already calculated for the current Rx beam in 504. The CSF report may comprise full CSI feedback (RI, PMI, CQI) for the current serving (traffic) beam. At 510, the UE transmits the updated CSF for the current serving beam to the base station if there is CSF report allocation provided to a UE, as determined at 508. If no CSF report coupled to P3 allocation is provided to the UE, as determined at 508, the UE determines at 512 whether a link adaptation (LA) CSI-RS resource allocation is provided to the UE before a next CSF report. LA CSI-RS resource is CSI-RS resource allocated for link adaptation purpose for the current serving beam. If no LA CSI-RS allocation is provided before the next CSF reporting allocation, the UE uses the updated CSF report for the current Rx beam for the next report at 514. If not, the UE ends the current P3 session at 516.

If the spectral efficiency condition is met, at 506, for at least one tested Rx beam, the UE may check at 518 whether there is an allocated CSF report already scheduled for the UE. The CSI report may be coupled or non-coupled to the P3 session. If the UE determines, at 518, that there is an allocated CSF report already scheduled for the UE, then the UE may be able to switch the Rx beam once the UE is able to send an updated CSF report for the newly selected Rx beam. In this case, the UE continues to 520.

If UE does not have a CSF report already allocated to the UE, then the UE may proceed to determine, at 522, whether the new Rx beam allows an improvement of the link even with the current CSF that is known to the base station, e.g., without a new CSF report from the UE. The determination at 522 enables the UE to check whether there is a benefit to switching Rx beam while continuing to work with the previously reported CSF, as there is no scheduled opportunity to provide an updated CSF report for the new Rx beam.

At 522, the UE determines whether a CQI for an Rx beam index (Rx_idx=i) based on the current PMI and/or current RI is better that the current CQI for the current Rx beam, e.g., whether CQI(Rx_idx=i,PMI_current, RI_current)≥ CQI_current. RI_current, PMI_current, CQI_current indicate the last reported CSF for the traffic beam or the current transmission configuration used for PDSCH. In the determination at 522, the UE compares the CQI or MCS that can be achieved with the new Rx beam coupled to the current PMI and RI configurations used by the base station for PDSCH transmissions with the current MCS/CQI coupled to the current CSF and current serving Rx beam. If the CQI for the new Rx beam (based on the current CSF) is better than the CQI for the current serving Rx beam, the UE may immediately switch to the new Rx beam at 524. While the CQI for the newly selected Rx beam may be further improved with a new CSF report, the newly selected Rx beam will provide an improvement even based on the previous CSF report. Thus, switching to the new beam will provide an improvement rather than a transient degradation. The comparison at 522 may be made for each tested Rx beams that yielded a maximum that met the criteria at 506, i.e. with a SPEFF higher than max SPEFF of the current Rx beam+Δ. If multiple Rx beam candidates meet the conditions of both 506 and 522, the Rx beam having the highest SPEFF from among the candidates, as determined at 526, may be used for immediate beam switching at 524. In this example, the switch can be made to the new Rx beam, at 524, without waiting to provide an updated CSF report to the base station. While the new Rx beam may perform even better with a corresponding new CSF report, the UE will receive gains in reception even based on the CSF report already known to the base station.

If the UE determined, at 518, that the UE has an allocation for a CSF report, the UE proceeds to 520. At 520, the UE determines for each tested reception beam Rx_idx that meets the criteria of 506, whether the CQI of the tested reception beam based on a current PMI+RI, is within a threshold amount (e.g., Thr) of the current CQI for the current Rx beam, i.e., whether CQI(Rx_idx=i, PMI_current, RI_current)≥CQI_current-Thr. The threshold amount (Thr) may correspond to an acceptable link degradation for short transient period, which may be defined in an MCS index count. This parameter Thr may be defined for robustness. For a very short transient period, the Thr could even be set to infinity or a max MCS index from MCS tables. The threshold Thr can be customized for each P3 session, e.g., depending on the scenario and/or a probability that the nearest full CSF report will be immediately adopted by the base station for PDSCH transmissions.

In order to make the determination at 520, the UE has already determined that the UE has an upcoming allocation for a CSF report. Thus, the UE will have an opportunity to provide an updated CSF report for the new selected Rx beam. However, as synchronized Rx beam switching mechanism are not available, a short transient period is likely. The determination at 520 limits the severity of the transient by using Thr in an inequality similar to the determination made at 522. When there is a very short turnaround time for the CSF from the moment of CSF report transmission by the UE in UL until full adoption by the base station for PDSCH allocations in DL, the threshold Thr may be larger. Thus, the threshold may have a relationship to the time until the next CSF report. This threshold value used at 520 provides robustness, e.g., in a worst-case scenario. In situations with a longer turnaround time, Thr may be lower, and when the CSF allocation is closer, Thr may be higher. When at least one beam candidate meets the condition at 520, as well as at 506, the UE continues to 528. When the condition at 520, and 506, is met for more than one Rx beam candidate, the UE may select the Rx beam candidate, at 534, having a highest SPEFF to be the selected new Rx beam.

Once the new Rx beam is selected at 534, following the determination at 520, the UE makes additional determinations in order to switch to the newly selected Rx beam at an optimal time and/or to minimize the time between the beam switch at the UE and reception of the updated CSF for this new Rx beam at the base station. At 528, when the UE has allocation of the full CSF report, the UE may determine whether the CSF report allocation is coupled or not coupled to P3 session. This determination may help the UE to determine the timing for switching to the new beam. As illustrated at 530, when the allocated CSF report is coupled to the P3 session, the updated CSF report for the different reception beam may be transmitted by the UE prior to switching to the different Rx beam, e.g., at 532.

If the UE determines, at 528, that the allocated CSF report is not coupled to the P3 session, the UE may determine, at 536, whether an allocated LA CSI-RS resource is before the next allocated CSF report. If not, the UE may report the updated CSF for the new beam to the base station, at 540, before the next CSI-RS resource allocation, e.g., at the nearest reporting time. Then, following the updated CSF report, the UE may switch to the new Rx beam at 542. The UE may switch to the new Rx beam, e.g., on the next slot following the update CSF report.

If a UE has first allocation for an LA CSI-RS resource before the CSF reporting slot, as determined at 536, the UE may switch to the new Rx beam, at 538, e.g., just before the allocated LA CSI-RS resource, e.g., just before the next CSI-RS reception. Thus, the CSF report that will be evaluated based on this resource will take in account the changed Rx beam and will be then reported on the nearest reporting slot.

If none of the new Rx beams that met the condition at 506 meet the condition at 520, then the UE refrains from switching to a new Rx beam and proceeds to the determinations at 508 and 512, similar to when the condition at 506 is not met.

When a UE did not receive an allocated CSF reporting slot when a P3 allocation was obtained, as determined at 518, and when none of the new Rx beams that met the condition at 506 also meet the condition at 522, the UE may want to wait for an additional amount of time for future allocations. Such future allocations may be scheduled for the UE, and once scheduled, the UE may determine to switch to a new Rx beam with knowledge that there will be a short transient time duration. Thus, the UE may determine at 544, whether a CQI for an RX beam candidate (Rx_idx=i) based on the current PMI and current RI is better than the CQI of the current beam by more than a threshold (Thr), e.g., CQI(Rx_idx=i, PMI_current, RI_current)≥CQI_current-Thr, similar to the determination at 520. The threshold Thr for the determination at 544 may be different than the threshold Thr used at 520, or may be the same. If the condition at 544 is not met, the UE may end the process, at 555. When the condition at 544, and 506, is met for more than one Rx beam candidate, the UE may select the Rx beam candidate, at 546, having a highest SPEFF to be the selected new Rx beam.

Once the new Rx beam is selected, whether at 544 or 546, the UE may wait at 548 for an allocated CSF reporting slot until an amount of time T is reached. T may be a time period defined for Rx beam switching decision aging and may be defined, e.g., in a unit number of slots. If the amount of time T passes, as determined at 550, without the UE receiving a CSF report allocation, then at 552, the UE ends the waiting. The UE may perform new tests, at 502, or in some scenarios to align with Rx beam selection based on other available pilot (SSB, which is allocated periodically may be a good candidate in a case where it is impossible to control the transient severity and/or select Rx beam based on SPEFF criteria). This timeout may help to avoid the aging of the Rx beam switching decision and may be important in situations of aperiodic CSI-RS allocation and CSF reporting. If a CSF reporting allocation is obtained, as determined at 536, before the timeout is reached, the UE may switch the Rx beam and report an updated CSF for the new Rx beam according to 538, 540, and 542, as described supra.

Beam switching in accordance with the aspects presented herein may enable the UE to make the best Rx beam selection based on SPEFF criteria with guaranteed improvement in the link conditions after the nearest CSF update. Aspects may provide a mechanism for avoidance or limited controlled link transient degradation in case of unsynchronized, autonomous Rx beam switching during CSF update turnaround time. Aspects may also minimize the link transient time that follows Rx beam switching for different CSF reporting and CSI-RS resources allocation scenarios. The aspects presented herein may provide an optimal Rx beam switching timing while avoiding Rx beam jitter and the aging of Rx beam selection decisions.

FIG. 6 is a flowchart 600 of a method of wireless communication. The method may be performed by a UE (e.g., the UE 104, 350, 404, the apparatus 702, 702')

communicating with a base station (e.g., 102, 180, 310, 402, 750). The wireless communication may comprise mmW based communication, e.g., 5G/NR communication. The method may be based on the example algorithm illustrated in FIGS. 5A and 5B. The method provides for improved reception beam switching that avoids reception beam jitter and reduces a link transient period. A link transient may refer to a temporary decrease in the quality of the link during the period that the base station does not have updated CSF information for the second reception beam. This inconsistency between the new beam used at the UE and the previous CSF information upon which the base station relies can reduce the quality of the link until the UE can provide updated CSF information at the next CSF report opportunity. Thus, a link transient refers to a negative impact in link performance that occurs for a period of time, e.g., when the UE switches beams and before the base station receives updated CSF information from the UE. A link transient period or a transient period refers to the duration of time over which the negative impact in link performance occurs, e.g., from the beam switch at the UE until the UE is able to send an updated CSF report for the new beam to the base station.

At 602, the UE receives CSI-RS on different reception beams in different symbols, wherein at least one reception beam is a current serving reception beam, e.g., as described in connection with 502 and 504 in FIG. 5A. The UE may estimate a spectral efficiency for each of a plurality of PMI and RI hypotheses for each CSI-RS symbol for a candidate reception beam, e.g., as described in connection with 504 in FIG. 5A.

At 604, the UE determines whether to switch to a different reception beam based on a spectral efficiency metric, e.g., SPEFF, for the different reception beam, e.g., RX_idx. The determination may also be based on the spectral efficiency of the current serving reception beam, e.g., Rx_current and CSF consistency, in order to consider a transient link duration for the second reception beam. For example, the determination may be based on a CSF opportunity, e.g., whether there is upcoming CSF allocated to the UE, the timing of the CSF allocation, the time until the CSF allocation, etc. so that the UE can take into account a difference in CSF information for the second reception beam and the CSF information, e.g., for the first beam, that is known by the base station from the previous CSF. The determination may be based, e.g., on aspects described in connection with FIGS. 5A and 5B, for example.

At 606, the UE may report an updated CSF report for the updated/different reception beam to a base station when the UE determines to switch this Rx beam. The UE may only provide an updated CSF report once the UE is allocated a slot for the CSF report. The base station may not know whether the report indicates a new Rx beam or merely a CSF update for the currently used Rx beam. As illustrated at 530 and 540, the updated CSF report for the different reception beam may be transmitted by the UE prior to switching to the different Rx beam, e.g., at 532, 542, respectively. In these two examples, the UE may report CSF in the nearest reporting slot and may switch to the different Rx beam in the next slot after reporting the updated CSF. In the example illustrated at 538, the UE may switch to the different Rx beam just prior to the next CSI-RS reception, e.g., prior to sending an updated CSF report. In the example illustrated at 524, the UE may switch to the different Rx beam immediately, e.g., prior to reporting the updated CSF.

The UE may determine at 604 to switch to a second beam from the current serving beam based at least in part on a maximum spectral efficiency for the second beam meeting a threshold in comparison to the maximum spectral efficiency for the current serving beam, e.g., when SPEFF_max (Rx_idx)>SPEFF_max(Rx_current)+Δ, as described in connection with 506 in FIG. 5A. The threshold may be defined for hysteresis to avoid Rx beam jitter.

When the UE does not have an allocated CSF report, the UE may switch to the second beam, at 608, when a CQI for the second beam coupled to a current PMI, RI configuration has a higher quality than a CQI for the current serving beam, e.g., as determined at 522 in FIG. 5A. The switch may be performed immediately upon making the determination, without waiting for an allocated CSF report. For this scenario, no DL link transient will be expected following autonomous non-synchronized Rx beam switch on the UE side.

When the current PMI and RI configuration coupled with the new Rx beam allows operational CQI lower than the CQI for the current serving beam during a transient period, the determination whether to switch at 604 may further be based on whether an operational CQI for the second beam coupled to the current PMI and RI configuration is lower than a CQI for the current serving beam by not more than a threshold amount, e.g., whether CQI(Rx_idx=i, PMI_current, RI_current)≥CQI_current-Thr. The threshold amount may be defined to control an amount of degradation during the transient time following the beam switch in Modulation and Coding Scheme (MCS) and Channel Quality Indicator (CQI) units and may be defined for robustness. Thus, this provides unsynchronized Rx beam switching with controlled severity of the link transient. This determination may correspond to the determination described in connection with 544.

When the operational CQI for the second beam coupled to the current PMI and RI configuration is lower than a CQI for the current serving beam by more than the threshold amount, the UE may refrain from switching to the second beam in order to avoid severe link degradation during the transient time When the UE does not yet have an allocated CSF reporting opportunity, and when the CQI for the second beam coupled to the current PMI and RI configuration is not higher or equal to the quality than the CQI for the current serving beam, the UE may refrain switching to the second beam until the UE transmits a CSF for the second beam, e.g., as described in connection with 540, 542, 548. In that situation, the condition in 544 may be a hold. Thus, the UE may switch to the second beam for reception at 608 after reporting the CSF at 606. Thus, the switching time to the second reception beam may be defined based on transient duration minimization, e.g., targeting transient duration minimization.

The UE may refrain from switching to the second beam until a next opportunity to provide updated CSF report, e.g., as described in connection with 548, 550. Thus, the UE may refrain from switching to the second beam until a CSF report is allocated such that the UE gets an opportunity to report the updated CSF for the new selected beam and before expiration of a timer for reception beam switching. By waiting until there will be an opportunity to provide an updated CSF report and by switching the Rx beam only after the updated CSF report provides transient time duration minimization/optimal Rx beam switching timing. Waiting for the allocated report can cause Rx beam decision aging. Therefore, a timer may be used to limit this waiting time to a predefined timeout threshold. For example, if the UE waits to switch to the second beam until the UE has an opportunity to send the updated CSF report and there is a large amount of time until the opportunity to send the updated CSF report, the change to the new beam may no longer be beneficial when the CSF report opportunity is reached. The timer gives the UE a time at which the UE should stop waiting to switch to the new beam and send the CSF report.

When the user equipment has an allocated CSF report, determining whether to switch, at 604, may include determining whether an operational CQI for the second beam coupled to the current PMI and RI configuration is not lower than a CQI for the current serving beam by more than a threshold amount, e.g., CQI(Rx_idx=i, PMI_current, RI_current)≥CQI_current-Thr, as described in connection with 520 in FIG. 5A.

When the CQI for the second beam coupled to the current PMI and RI configuration is not lower than the CQI for the current serving beam by more than the threshold amount, the UE may switch to the second beam for reception at 608 after reporting a CSF for the second beam, e.g., as described in connection with 530, 532.

Thus, the UE may perform unsynchronized, autonomous switching of the reception beam based on SPEFF in a way that enables the UE to switch to a better Rx beam while minimizing the transient duration.

Figure 7:
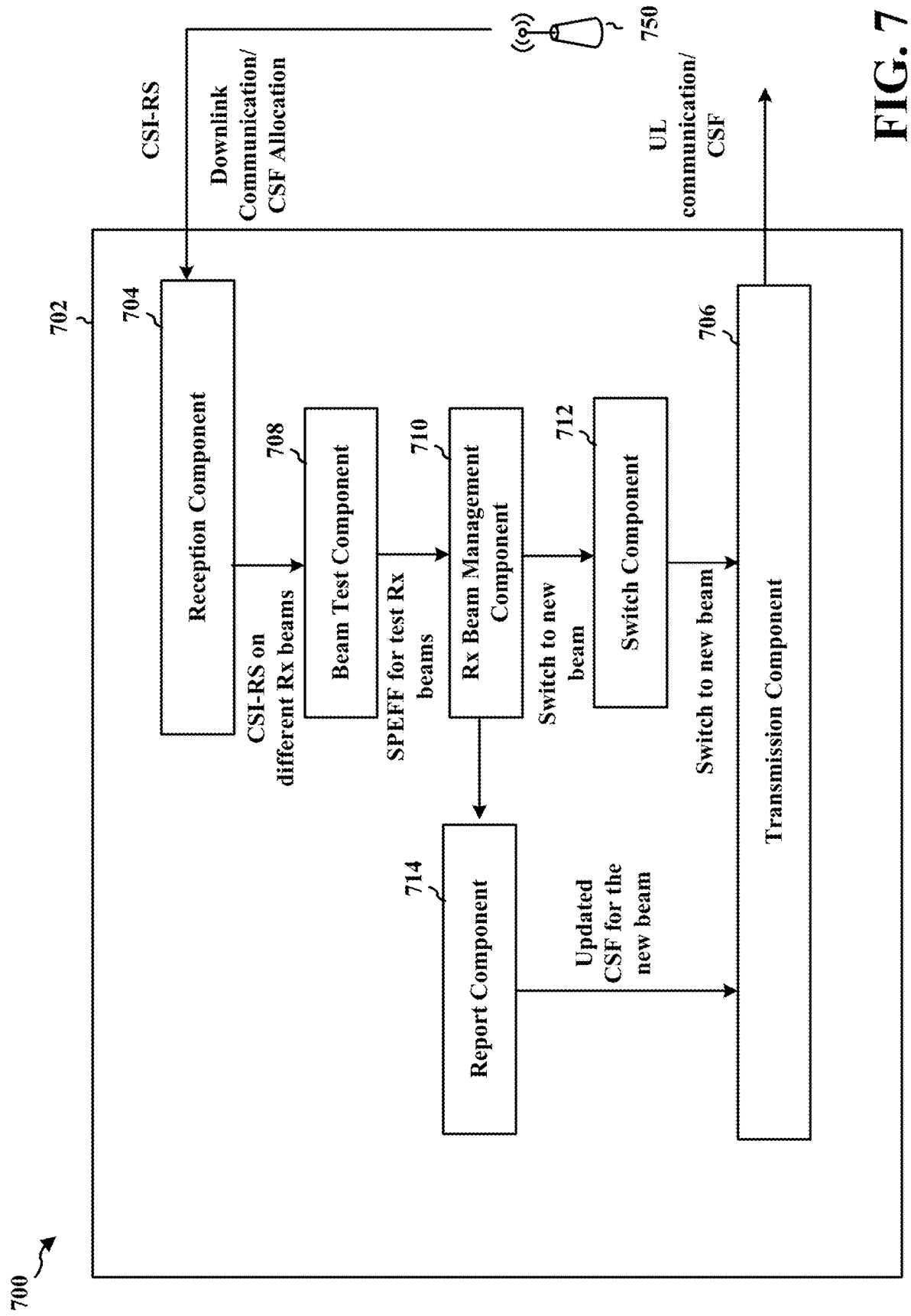
FIG. 7 is a conceptual data flow diagram illustrating the data flow between different means/components in an exemplary apparatus.

FIG. 7 is a conceptual data flow diagram 700 illustrating the data flow between different means/components in an exemplary apparatus 702. The apparatus may be a UE (e.g., the UE 104, 350, 404). The apparatus includes a reception component 704 that receives downlink communication from base station 750 and a transmission component 706 that transmits uplink communication to the base station 750. The reception component and transmission component may communicate using beams as described in connection with FIG. 4. The apparatus may further include a receiving a Beam Test Component 708 configured to receive CSI-RS on different reception beams in different symbols, wherein at least one reception beam is a current serving reception beam. The apparatus may include an Rx Beam Management Component 710 configured to determine whether to switch to a different reception beam based on a spectral efficiency metric or other measurement for the different reception beam, e.g., as described in any of the aspects described in connection with FIGS. 5A, 5B, 6, and/or 9. The determination may be further based on a spectral efficiency for the current serving reception beam.

The UE may include a switch component 712 configured to switch from a current Rx beam to a second Rx beam based on the determination by the Rx beam management component 710, e.g., as described in any of the aspects described in connection with FIGS. 5, 6, and 9. As described in connection with FIG. 9, the switch component 712 may wait to switch to the different reception beam until after a CSF report opportunity, when a link transient is expected.

The apparatus may include a report component 714 configured to report an updated CSF report to the base station for the different reception beam, when the UE determines to switch to the different reception beam.

The apparatus may include additional components that perform each of the blocks of the algorithm in the aforementioned flowcharts of FIGS. 5A, 5B, 6, and/or 9. As such, each block in the aforementioned flowcharts of FIGS. 5A, 5B, 6, and/or 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 8:
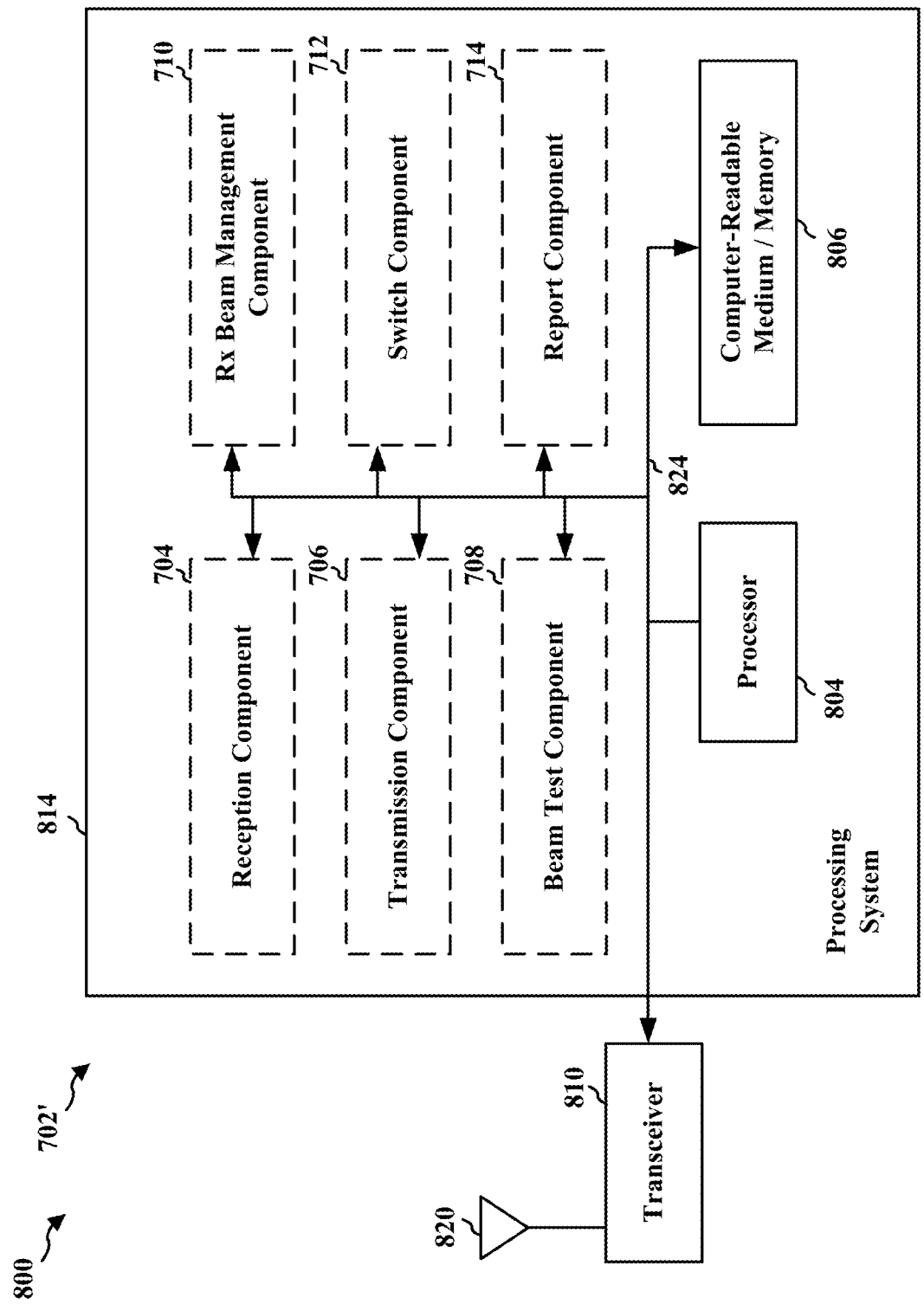
FIG. 8 is a diagram illustrating an example of a hardware implementation for an apparatus employing a processing system.

FIG. 8 is a diagram 800 illustrating an example of a hardware implementation for an apparatus 702' employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware components, represented by the processor 804, the components 704, 706, 708, 710, 712, 714, and the computer-readable medium/memory 806. The bus 824 may also link various other circuits such as timing sources, peripherals, voltage regulators, and power management circuits, which are well known in the art, and therefore, will not be described any further.

The processing system 814 may be coupled to a transceiver 810. The transceiver 810 is coupled to one or more antennas 820. The transceiver 810 provides a means for communicating with various other apparatus over a transmission medium. The transceiver 810 receives a signal from the one or more antennas 820, extracts information from the received signal, and provides the extracted information to the processing system 814, specifically the reception component 704. In addition, the transceiver 810 receives information from the processing system 814, specifically the transmission component 706, and based on the received information, generates a signal to be applied to the one or more antennas 820. The processing system 814 includes a processor 804 coupled to a computer-readable medium/memory 806. The processor 804 is responsible for general processing, including the execution of software stored on the computer-readable medium/memory 806. The software, when executed by the processor 804, causes the processing system 814 to perform the various functions described supra for any particular apparatus. The computer-readable medium/memory 806 may also be used for storing data that is manipulated by the processor 804 when executing software. The processing system 814 further includes at least one of the components 704, 706, 708, 710, 712, 714. The components may be software components running in the processor 804, resident/stored in the computer readable medium/memory 806, one or more hardware components coupled to the processor 804, or some combination thereof. The processing system 814 may be a component of the UE 350 and may include the memory 360 and/or at least one of the TX processor 368, the RX processor 356, and the controller/processor 359.

In one configuration, the apparatus 702/702' for wireless communication includes means for receiving a CSI-RS on different reception beams in different symbols, wherein at least one reception beam is a current serving reception beam (e.g., at least processor 804, memory 806, reception component 704, beam test component and/or antenna 820, etc.); means for determining whether to switch to a different reception beam based on a spectral efficiency metric or other measurement for the different reception beam (e.g., at least processor 804, memory 806, and/or Rx beam management component 710, etc.); means for reporting an updated CSF to a base station when the apparatus determines to switch to a new/different Rx beam (e.g., at least processor 804, memory 806, and/or report component 714, transmission component 706, etc.); and means for switching from a current Rx beam to a second Rx beam (e.g., at least processor 804, memory 806, and/or switch component 712, etc.). The aforementioned means may be one or more of the aforementioned components of the apparatus 702 and/or the processing system 814 of the apparatus 702' configured to perform the functions recited by the aforementioned means. As described supra, the processing system 814 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 9:
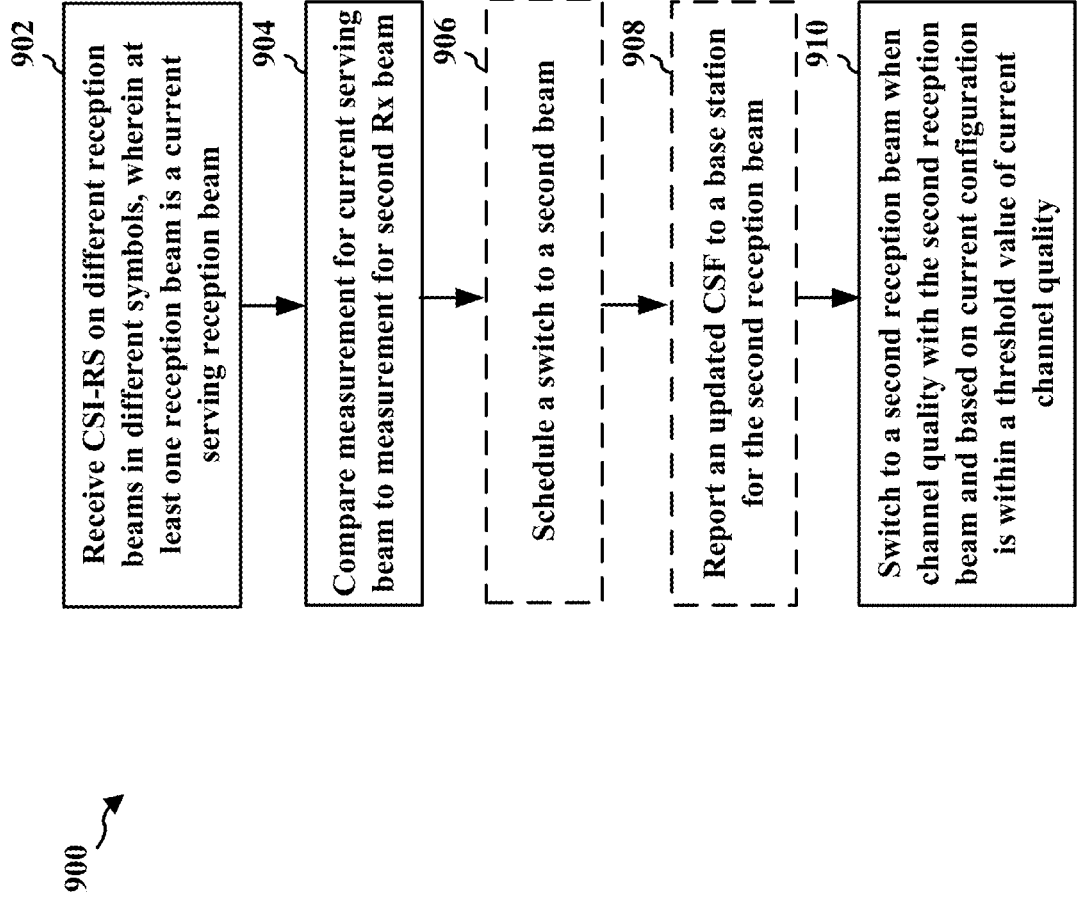
FIG. 9 is a flowchart of a method of wireless communication.

FIG. 9 is a flowchart 900 of a method of wireless communication at a UE for minimizing transient time duration. The method may be performed by a UE (e.g., the UE 104, 350, 404, the apparatus 702, 702') communicating with a base station (e.g., 102, 180, 310, 402, 750). The wireless communication may comprise mmW based communication, e.g., 5G/NR communication. The method may be based on aspects of the example algorithm illustrated in FIGS. 5A and 5B. The method may help a UE to refine the reception beam used by the UE in a manner that avoids or minimizes a transient duration of potential link degradation based on the switch.

At 902, the UE receives CSI-RS on different reception beams in different symbols, wherein at least one reception beam is a current serving reception beam, e.g., as described in connection with FIGS. 4, 5A, 5B, and 6. The CSI-RS may be transmitted by a base station to enable a UE to make measurements of the quality of various reception beams. Each set of measurements by the UE may include the current serving beam, e.g., as a reference for the measurements.

At 904, the UE compares a first measurement for the current serving reception beam to a second measurement for a second reception beam from among the different reception beams, e.g., as described in connection with 506 in FIG. 5A. The measurement may be based on a spectral efficiency, e.g., as described in connection with FIGS. 5A, 5B, and 6. However, the measurement may also be based on other characteristics than spectral efficiency, e.g., based on RSRP.

The UE may then determine whether a link transient will occur, or is expected to occur, and may determine a severity of the expected link transient, e.g., by determining whether a first channel quality of the first reception beam is within a threshold value of the second reception beam using the current PMI and current RI, e.g., whether CQI ($Rx_{id2}$, $PMI_{current}$, $RI_{current}$)≥$CQI_{current}$–a threshold. The determination may be made for all candidate beams that have a better measurement, e.g., SPEFF, than the current serving beam, e.g., as determined at 904.

At 910, the UE switches to the second reception beam when a first channel quality for the current serving reception beam is within a threshold value of a second channel quality for the second reception beam, the second channel quality being measured using a current configuration. For example, the UE may make determinations, as described in connection with any of 518, 520, 522, or 544 in FIGS. 5A, 5B. The UE may determine whether the link transient will occur, e.g., qualified above a configurable threshold (THR) that may be defined in terms of an expected CQI/MCS degradation, based on the second measurement for the second reception beam using a configuration based on a previously reported CSF or a prior downlink allocation, e.g., based on a measurement for the second beam using a current PMI and RI configuration. The UE may use the PMI/RI used for the last downlink allocation, for example, because the NW does not have to follow the prior CSF report and may use a different configuration of PMI/RI for the previous downlink allocation. The wherein the UE may determine that no link transient will occur when the second measurement comprises a second reception beam CQI for the second reception beam coupled to a current PMI and a current RI configuration that has a higher quality than a current reception beam CQI for the current serving reception beam, e.g., as described in connection with 522. When no link transient will occur, e.g., when CQI ($Rx_{id2}$, $PMI_{current}$, $RI_{current}$)≥$CQI_{current}$, the UE may determine to switch to the second reception beam, as described in connection with 524 and/or 526. Thus, at 910, the UE may switch to the second reception beam when the second measurement for the second reception beam indicates a higher quality than the first measurement for the current serving reception beam in addition to the first channel quality for the current serving reception beam being within the threshold value of the second channel quality of the second reception beam.

The UE may determine whether to switch to the second reception beam based on a comparison of the first measurement for the current serving reception beam and the second measurement for the second reception beam, as compared at 904, and further based on a severity of an anticipated link transient. The aspects presented herein enable transient link duration minimization regardless of the type of measurement used to determine whether to switch Rx beams through the timing of the switch relative to a CSF report allocation.

When a link transient is expected, the UE may wait to switch to the different reception beam until after a CSF report opportunity. By waiting until there will be an opportunity to provide an updated CSF report and by switching the Rx beam only after the updated CSF report provides transient time duration minimization/optimal Rx beam switching timing, e.g., as described in connection with 530 and 532, 540 and 542, 548, etc. Thus, at 906, the UE may schedule a switch to the second reception beam after a CSF reporting opportunity for a link obtained with the second reception beam, if the second channel quality of the second reception beam is less than the first channel quality of the current serving reception beam. By delaying the switch, the UE reduces the amount of time that the link quality is affected prior to sending a CSF report based on the new beam. The reduction in time reduces the duration of the link transient period, e.g., the period of time from the beam switch until the CSF report.

The UE may switch to the different reception beam without waiting for the CSF report opportunity in certain circumstances, e.g., when no CSF report opportunity is allocated to the UE, as described in connection with 538.

As illustrated at 908, the UE may report an updated CSF report to a base station. As described in connection with 530, 540, etc., the UE may transmit the updated CSF report prior to switching to the different Rx beam at 532 and 542. If no link transient will occur, the UE may switch to the second reception beam prior to reporting the updated CSF report.

The UE may continue to use the current serving reception beam if a timer for reception beam switching expires before the CSF reporting opportunity. The timer may help to avoid aging of the reception beam switching decision. Therefore, a timer may be used to limit the time spent waiting for a CSF reporting opportunity to a predefined timeout threshold, as described in connection with 550 in FIG. 5B.

Thus, the UE may perform unsynchronized, autonomous switching of the current serving reception beam.

Figure 10:
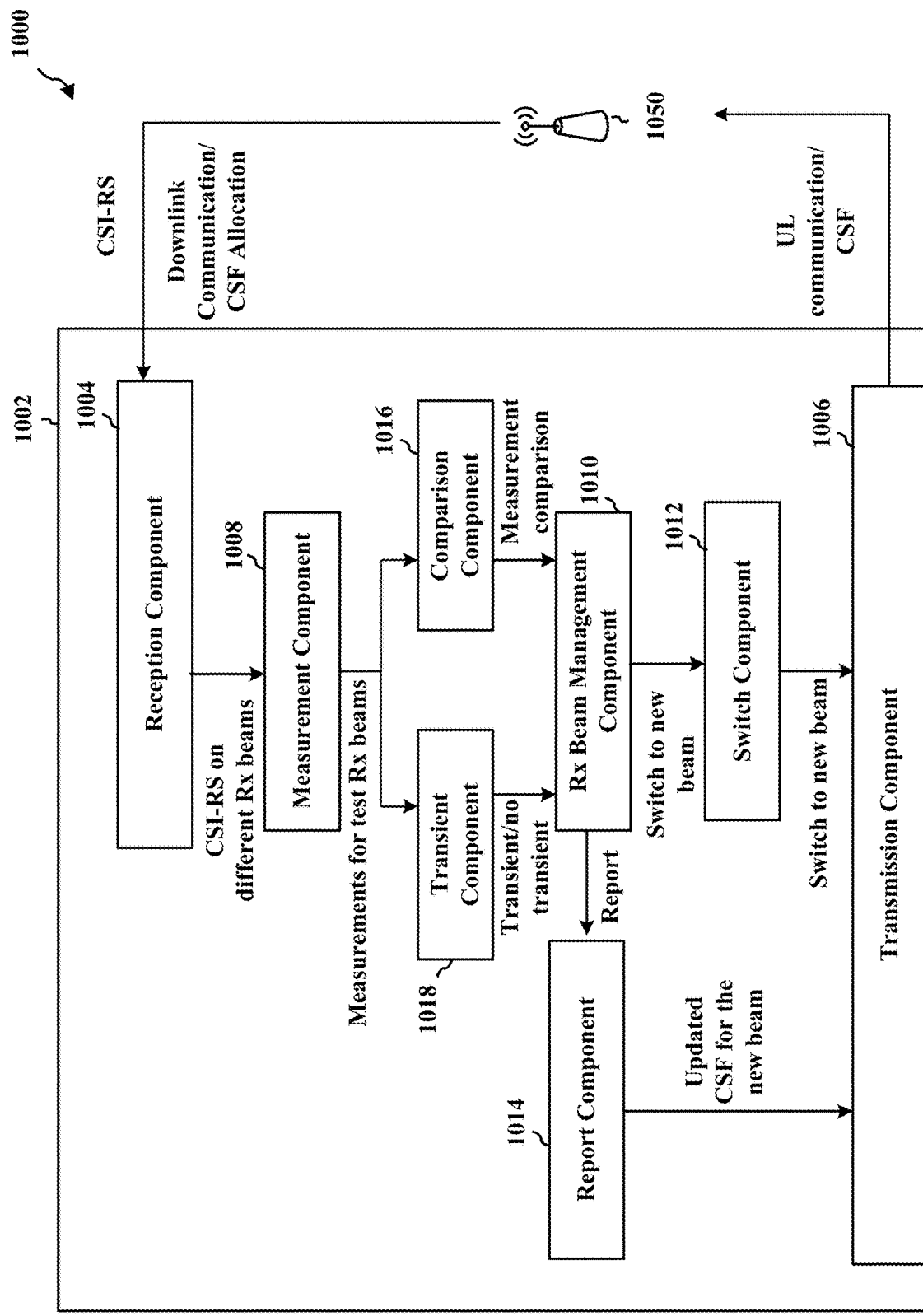
FIG. 10 is a conceptual data flow diagram illustrating the data flow between different means/components in an exemplary apparatus.

FIG. 10 is a conceptual data flow diagram 1000 illustrating the data flow between different means/components in an exemplary apparatus 1002. The apparatus may be a UE (e.g., the UE 104, 350, 404). The apparatus includes a reception component 1004 that receives downlink communication from base station 1050 and a transmission component 1006 that transmits uplink communication to the base station 1050. The reception component and transmission component may communicate using beams as described in connection with FIG. 4. The apparatus may further include a receiving a measurement component 1008 configured to receive CSI-RS on different reception beams, e.g., in different symbols, wherein at least one reception beam is a current serving reception beam. The apparatus may include a comparison component 1016 configured to compare a first measurement for the current serving reception beam to measurement for different reception beams. The apparatus may include a transient component 1018 configured to determine whether a link transient will occur if a switch is performed from the current serving reception beam to a second reception beam, e.g., whether a first channel quality for the current serving reception beam is within a threshold value of a second channel quality for the second reception beam, the second channel quality being measured using a current configuration. The determination may be made for all candidate beams that have a better measurement, e.g., SPEFF, than the current serving beam. The apparatus may include an Rx Beam Management Component 1010 configured to determine whether to switch to the second reception beam based on a comparison of the first measurement for the current serving reception beam and/or based on the channel quality of the current serving reception beam and a channel quality of the second reception beam. For example, the Rx beam management component 1010 may determine to switch to the second reception beam when a first channel quality for the current serving reception beam is within a threshold value of a second channel quality for the second reception beam, the second channel quality being measured using a current configuration. The Rx beam management component may be based on whether the link transient will occur and a severity in channel quality degradation and/or length, e.g., as described in any of the aspects described in connection with FIGS. 5A, 5B, 6, and/or 9.

The UE may include a switch component 1012 configured to switch from a current Rx beam to a second Rx beam based on the determination by the Rx beam management component 1010, e.g., as described in any of the aspects described in connection with FIGS. 5A, 5B, 6, and/or 9. The switch component 1012 may be configured to schedule a switch to the second reception beam after a CSF reporting opportunity for a link obtained with the second reception beam, if the second channel quality of the second reception beam is less than the first channel quality of the current serving reception beam. As described in connection with FIG. 9, the switch component 1012 may wait to switch to the different reception beam until after a CSF report opportunity, when a link transient qualified above configurable THR defined by means of CQI/MCS degradation is expected.

The apparatus may include a report component 1014 configured to report an updated CSF report to a base station prior to the switch to the second reception beam.

The apparatus may include additional components that perform each of the blocks of the algorithm in the aforementioned flowcharts of FIGS. 5A, 5B, 6, and 9. As such, each block in the aforementioned flowcharts of FIGS. 5A, 5B, 6, and 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
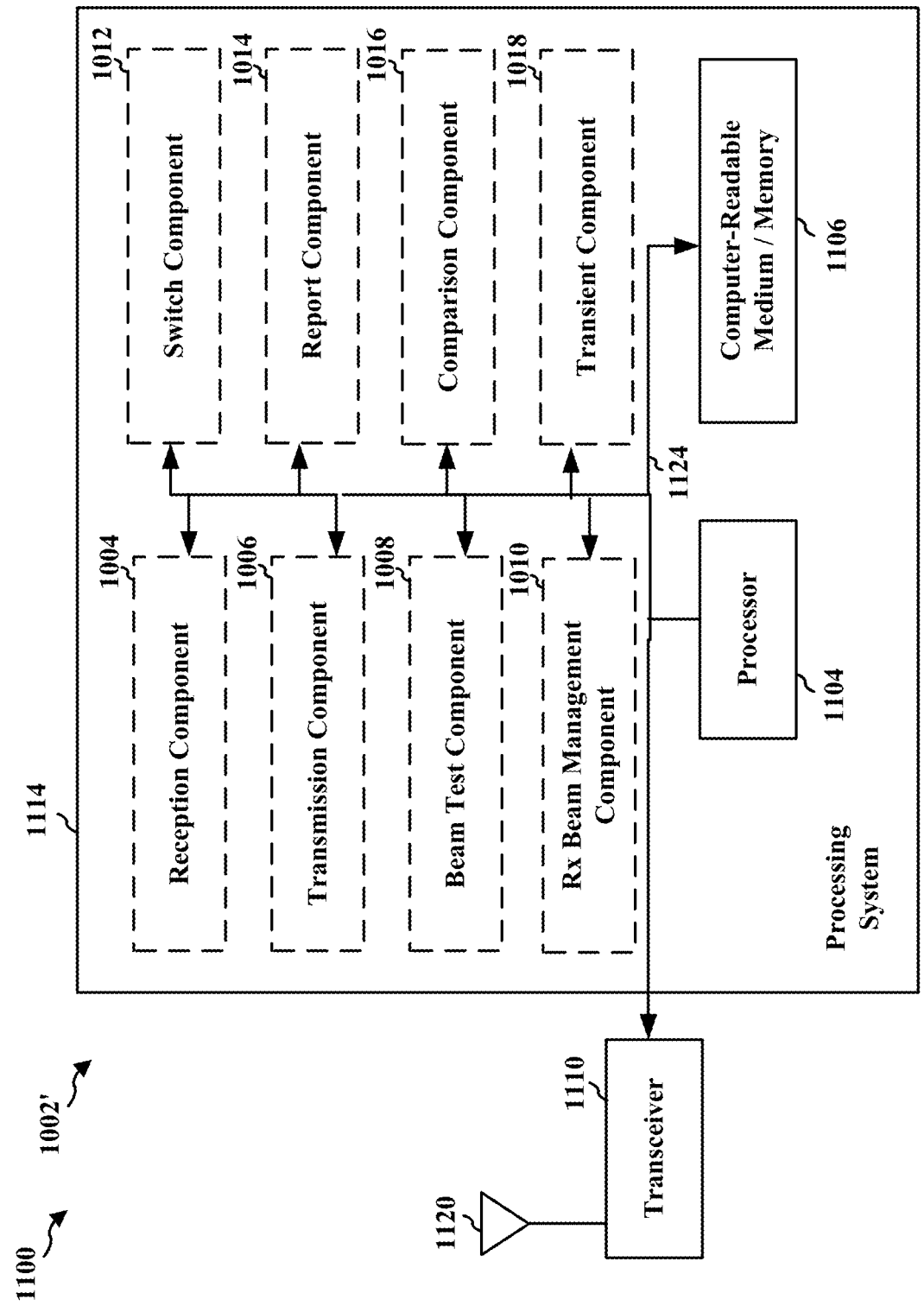
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, 1012, 1014, 1016, 1018, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1006, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010, 1012, 1014, 1016, 1018. The components may be software components running in the processor 1104, resident/stored in the computer readable medium/memory 1106, one or more hardware components coupled to the processor 1104, or some combination thereof. The processing system 1114 may be a component of the UE 350 and may include the memory 360 and/or at least one of the TX processor 368, the RX processor 356, and the controller/processor 359.

In one configuration, the apparatus 1002/1002' for wireless communication includes means for receiving a Channel State Information Reference Signal (CSI-RS) on different reception beams in different symbols, wherein at least one reception beam is a current serving reception beam; means for comparing a first measurement for the current serving reception beam to a second measurement for a second reception beam from among the different reception beams; means for switching to the second reception beam when a first channel quality for the current serving reception beam is within a threshold value of a second channel quality for the second reception beam, the second channel quality being measured using a current configuration; means for scheduling a switch to the second reception beam after a CSF reporting opportunity for a link obtained with the second reception beam, if the second channel quality of the second reception beam is less than the first channel quality of the current serving reception beam; means for reporting an updated CSF report to a base station prior to the switch to the second reception beam. The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE) for minimizing transient time duration, comprising:
    receiving a Channel State Information Reference Signal (CSI-RS) on different reception beams in different symbols, wherein at least one reception beam is a current serving reception beam;
    comparing a first measurement for the current serving reception beam to a second measurement for a second reception beam from among the different reception beams; and
    switching to the second reception beam when a first channel quality for the current serving reception beam is within a threshold value of a second channel quality for the second reception beam, the second channel quality being measured using a current configuration.

2. The method of claim 1, further comprising:
    scheduling a switch to the second reception beam after a Channel State Feedback (CSF) reporting opportunity for a link obtained with the second reception beam, if the second channel quality of the second reception beam is less than the first channel quality of the current serving reception beam.

3. The method of claim 2, wherein the UE continues to use the current serving reception beam if a timer for reception beam switching expires before the CSF reporting opportunity.

4. The method of claim 2, further comprising:
    reporting an updated CSF report to a base station prior to switching to the second reception beam.

5. The method of claim 1, wherein the second measurement for the second reception beam is performed using the current configuration based on a previously reported Channel State Feedback (CSF) or a prior downlink allocation.

6. The method of claim 1, wherein the UE switches to the second reception beam when a second reception beam Channel Quality Indicator (CQI) for the second reception beam coupled to a current precoding matrix indicator (PMI) and a current rank indicator (RI) configuration has a higher quality than a current serving reception beam CQI for the current serving reception beam.

7. The method of claim 1, wherein the UE switches to the second reception beam when the second measurement for the second reception beam indicates a higher quality than the first measurement for the current serving reception beam in addition to the first channel quality for the current serving reception beam being within the threshold value of the second channel quality of the second reception beam.

8. The method of claim 1, wherein the first measurement and the second measurement are based on a spectral efficiency metric.

9. An apparatus for wireless communication at a user equipment (UE) for minimizing transient time duration, comprising:
    means for receiving a Channel State Information Reference Signal (CSI-RS) on different reception beams in different symbols, wherein at least one reception beam is a current serving reception beam;
    means for comparing a first measurement for the current serving reception beam to a second measurement for a second reception beam from among the different reception beams; and
    means for switching to the second reception beam when a first channel quality for the current serving reception beam is within a threshold value of a second channel quality for the second reception beam, the second channel quality being measured using a current configuration.

10. The apparatus of claim 9, further comprising:
    means for scheduling a switch to the second reception beam after a Channel State Feedback (CSF) reporting opportunity for a link obtained with the second reception beam, if the second channel quality of the second reception beam is less than the first channel quality of the current serving reception beam.

11. The apparatus of claim 10, wherein the UE continues to use the current serving reception beam if a timer for reception beam switching expires before the CSF reporting opportunity.

12. The apparatus of claim 10, further comprising:
means for reporting an updated CSF report to a base station prior to switching to the second reception beam.

13. The apparatus of claim 9, wherein the second measurement for the second reception beam is performed using the current configuration based on a previously reported Channel State Feedback (CSF) or a prior downlink allocation.

14. The apparatus of claim 9, wherein the UE switches to the second reception beam when a second reception beam Channel Quality Indicator (CQI) for the second reception beam coupled to a current precoding matrix indicator (PMI) and a current rank indicator (RI) configuration has a higher quality than a current serving reception beam CQI for the current serving reception beam.

15. The apparatus of claim 9, wherein the means for switching switch to the second reception beam when the second measurement for the second reception beam indicates a higher quality than the first measurement for the current serving reception beam in addition to the first channel quality for the current serving reception beam being within the threshold value of the second channel quality of the second reception beam.

16. The apparatus of claim 9, wherein the first measurement and the second measurement are based on a spectral efficiency metric.

17. An apparatus for wireless communication at a user equipment (UE) for minimizing transient time duration, comprising:
a memory; and
at least one processor coupled to the memory and configured to:
receive a Channel State Information Reference Signal (CSI-RS) on different reception beams in different symbols, wherein at least one reception beam is a current serving reception beam;
compare a first measurement for the current serving reception beam to a second measurement for a second reception beam from among the different reception beams; and
switch to the second reception beam when a first channel quality for the current serving reception beam is within a threshold value of a second channel quality for the second reception beam, the second channel quality being measured using a current configuration.

18. The apparatus of claim 17, wherein the at least one processor is further configured to:
schedule a switch to the second reception beam after a Channel State Feedback (CSF) reporting opportunity for a link obtained with the second reception beam, if the second channel quality of the second reception beam is less than the first channel quality of the current serving reception beam.

19. The apparatus of claim 18, wherein the UE continues to use the current serving reception beam if a timer for reception beam switching expires before the CSF reporting opportunity.

20. The apparatus of claim 18, wherein the at least one processor is further configured to:
report an updated CSF report to a base station prior to switching to the second reception beam.

21. The apparatus of claim 17, wherein the second measurement for the second reception beam is performed using the current configuration based on a previously reported Channel State Feedback (CSF) or a prior downlink allocation.

22. The apparatus of claim 17, wherein the UE switches to the second reception beam when a second reception beam Channel Quality Indicator (CQI) for the second reception beam coupled to a current precoding matrix indicator (PMI) and a current rank indicator (RI) configuration has a higher quality than a current serving reception beam CQI for the current serving reception beam.

23. The apparatus of claim 17, wherein the UE switches to the second reception beam when the second measurement for the second reception beam indicates a higher quality than the first measurement for the current serving reception beam in addition to the first channel quality for the current serving reception beam being within the threshold value of the second channel quality of the second reception beam.

24. The apparatus of claim 17, wherein the first measurement and the second measurement are based on a spectral efficiency metric.

25. A non-transitory computer-readable medium storing computer executable code for wireless communication at a user equipment (UE) for minimizing transient time duration, comprising code to:
receive a Channel State Information Reference Signal (CSI-RS) on different reception beams in different symbols, wherein at least one reception beam is a current serving reception beam;
compare a first measurement for the current serving reception beam to a second measurement for a second reception beam from among the different reception beams; and
switch to the second reception beam when a first channel quality for the current serving reception beam is within a threshold value of a second channel quality for the second reception beam, the second channel quality being measured using a current configuration.

26. The non-transitory computer-readable medium of claim 25, further comprising code to:
schedule a switch to the second reception beam after a Channel State Feedback (CSF) reporting opportunity for a link obtained with the second reception beam, if the second channel quality of the second reception beam is less than the first channel quality of the current serving reception beam; and
report an updated CSF report to a base station prior to switching to the second reception beam.

27. The non-transitory computer-readable medium of claim 25, wherein the second measurement for the second reception beam is performed using the current configuration based on a previously reported Channel State Feedback (CSF) or a prior downlink allocation.

28. The non-transitory computer-readable medium of claim 25, wherein the UE switches to the second reception beam when a second reception beam Channel Quality Indicator (CQI) for the second reception beam coupled to a current precoding matrix indicator (PMI) and a current rank indicator (RI) configuration has a higher quality than a current serving reception beam CQI for the current serving reception beam.

29. The non-transitory computer-readable medium of claim 25, wherein the UE switches to the second reception beam when the second measurement for the second reception beam indicates a higher quality than the first measurement for the current serving reception beam in addition to the first channel quality for the current serving reception beam being within the threshold value of the second channel quality of the second reception beam.

30. The non-transitory computer-readable medium of claim 25, wherein the first measurement and the second measurement are based on a spectral efficiency metric.

* * * * *